United States Patent
Yang et al.

(10) Patent No.: US 9,132,835 B2
(45) Date of Patent: Sep. 15, 2015

(54) ENHANCED CROSSWIND COMPENSATION (71) Applicant: FORD GLOBAL TECHNOLOGIES, LLC, Dearborn, MI (US)

(72) Inventors: Hsin-Hsiang Yang, Ann Arbor, MI (US); Kwaku O. Prakah-Asante, Commerce Township, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 13/957,792

(22) Filed: Aug. 2, 2013

(65) Prior Publication Data

US 2015/0039183 A1 Feb. 5, 2015

(51) Int. Cl.
*B62D 37/00* (2006.01)
*B60W 30/02* (2012.01)
*B60W 10/20* (2006.01)
*B60W 10/22* (2006.01)

(52) U.S. Cl.
CPC ............ *B60W 30/025* (2013.01); *B60W 10/20* (2013.01); *B60W 10/22* (2013.01)

(58) Field of Classification Search
CPC ........... B62D 1/286; B62D 7/159; B62D 6/04
USPC ........ 701/1, 38, 48, 41, 42, 72; 180/6.2, 6.44, 180/234, 411; 280/91.1, 93.501
See application file for complete search history.

(56) References Cited

U.S. PATENT DOCUMENTS

| | | | | |
|---|---|---|---|---|
| 5,508,929 | A * | 4/1996 | Harada | 701/48 |
| 5,555,495 | A | 9/1996 | Bell et al. | |
| 5,925,083 | A | 7/1999 | Ackermann | |
| 6,523,911 | B1 | 2/2003 | Rupp et al. | |
| 7,487,021 | B2 | 2/2009 | Shin et al. | |
| 7,516,965 | B2 | 4/2009 | Horiuchi | |
| 7,536,246 | B2 * | 5/2009 | Cho | 701/41 |
| 8,258,934 | B2 | 9/2012 | Filev et al. | |
| 8,504,243 | B2 * | 8/2013 | Kageyama | 701/41 |
| 2005/0267666 | A1 | 12/2005 | Suzumura et al. | |
| 2006/0220912 | A1 | 10/2006 | Heenan et al. | |
| 2006/0249326 | A1 | 11/2006 | Birsching et al. | |
| 2008/0015754 | A1* | 1/2008 | Hac | 701/48 |
| 2008/0147276 | A1 | 6/2008 | Pattok et al. | |
| 2012/0197496 | A1 | 8/2012 | Limpibuntering et al. | |
| 2014/0041958 | A1 | 2/2014 | Iijima et al. | |

OTHER PUBLICATIONS

Crosswind Sensitivity of Passenger Cars and the Influence of Chassis and Aerodynamic Properties on Driver Preferences, CC. MacAdam et al., Vehicle System Dynamics, 19 (1990). pp. 201-236 (36 pages).

(Continued)

*Primary Examiner* — Dalena Tran
(74) *Attorney, Agent, or Firm* — Raymond L. Coppiellie; Brooks Kushman P.C.

(57) ABSTRACT

A device may estimate crosswind by a vehicle controller according to driver steering inputs indicative of driver intention and crosswind disturbance inputs indicative of a potential crosswind condition. The device may, if the estimated crosswind exceeds a predetermined threshold, utilize the vehicle controller to correct the crosswind condition to reduce vehicle control demand on the driver, the automatic correction including at least one of a steering angle adjustment and suspension stiffness adjustment.

21 Claims, 10 Drawing Sheets

(56) References Cited

OTHER PUBLICATIONS

Yang, Hsin-Hsiang, Driver Models to Emulate Human Anomalous Behaviors Leading to Vehicle Lateral and Longitudinal Accidents, A dissertation submitted in partial fulfillment of the requirements for the degree of Doctor of Philosophy (Mechanical Engineering) in The University of Michigan 2010 (153 pages).

Non-Final Office Action dated Jun. 19, 2014 for U.S. Appl. No. 13/916,650.

Notice of Allowance dated Mar. 30, 2015 for U.S. Appl. No. 13/916,650.

* cited by examiner

Ride Performance of Variable Suspension Stiffness Based on Crosswind Estimation

FIG. 8

ENHANCED CROSSWIND COMPENSATION

BACKGROUND

Headwinds may be defined as winds that blow parallel to and against a direction of travel, while tailwinds may be defined as winds that blow parallel to and with the direction of travel. Crosswinds may be defined as winds that blow in a direction other than parallel to the direction of travel, and therefore include a perpendicular component compared to the direction of travel. Headwinds or tailwinds may be corrected for by a driver by way of throttle or brake input. However, correction for crosswind conditions may be more complicated, and may require the driver to provide steering inputs in addition to other driver corrections to preserve a desired vehicle heading and speed. Crosswind situations may therefore be uncomfortable for the driver, and may impose increased demand and workload on the primary vehicle control task.

SUMMARY

A method may include estimating crosswind by a vehicle controller according to driver steering inputs indicative of driver intention and crosswind disturbance inputs indicative of a potential crosswind condition; and when the estimated crosswind exceeds a predetermined threshold, utilizing the vehicle controller to correct the crosswind condition to reduce vehicle control demand on the driver, the automatic correction including at least one of a steering angle adjustment and suspension stiffness adjustment.

A computing device storing an application executable by a processor of the computing device to provide operations including estimating crosswind by a vehicle controller according to driver steering inputs indicative of driver intention and crosswind disturbance inputs indicative of a potential crosswind condition; and when the estimated crosswind exceeds a predetermined threshold, utilizing the vehicle controller to correct the crosswind condition to reduce vehicle control demand on the driver, the automatic correction including at least one of a steering angle adjustment and suspension stiffness adjustment.

A non-transitory computer-readable medium tangibly embodying computer-executable instructions of a software program, the software program being executable by a processor of a computing device to provide operations including estimating crosswind by a vehicle controller according to driver steering inputs indicative of driver intention and crosswind disturbance inputs indicative of a potential crosswind condition; and when the estimated crosswind exceeds a predetermined threshold, utilizing the vehicle controller to correct the crosswind condition to reduce vehicle control demand on the driver, the automatic correction including at least one of a steering angle adjustment and suspension stiffness adjustment

DETAILED DESCRIPTION

The impact of crosswinds while driving may be estimated by computing a discrepancy between a driver-intended vehicle motion and actual vehicle motion. For example, inputs to the active power steering system and sensing elements from electronic stability control (ESC) and/or roll stability control (RSC) systems may be utilized to make a determination of crosswind disturbance. Upon detection of a crosswind condition, a control system may be configured to update vehicle settings to attempt to correct for the identified crosswind to reduce vehicle control demand on the driver. For example, the adaptive drive control system may be configured to command a steering assistance system to apply an offset steering angle to make automatic correction for the detected crosswind condition to the motion of the vehicle. As another example, the adaptive drive control system may be configured to command a variable roll-stiffness system of the vehicle to tighten the suspension to reduce crosswind-induced roll. By taking one or more of these corrective actions, the control system may compensate for the detected crosswind disturbance and help to reduce driver demand and increase driver comfort.

In some examples, an improved crosswind estimation approach may be utilized to improve the detection of crosswind to be corrected. As one example, a recursive-least-squares method, with multiple forgetting factors for estimating vehicle uncertainty and crosswind disturbance simultaneously, may be utilized to provide for improved estimation of fast-changing crosswinds. The forgetting factors may reduce the influence of older data and be chosen to account for relatively slower-changing vehicle uncertainty and relatively faster-changing crosswind conditions. The improved estimation of crosswind may provide increased sensitivity to mild crosswind estimation using basic vehicle sensors, with a minimum of memory storage, thereby providing for more accurate correction actions to address crosswind conditions that may be experienced.

Figure 1:
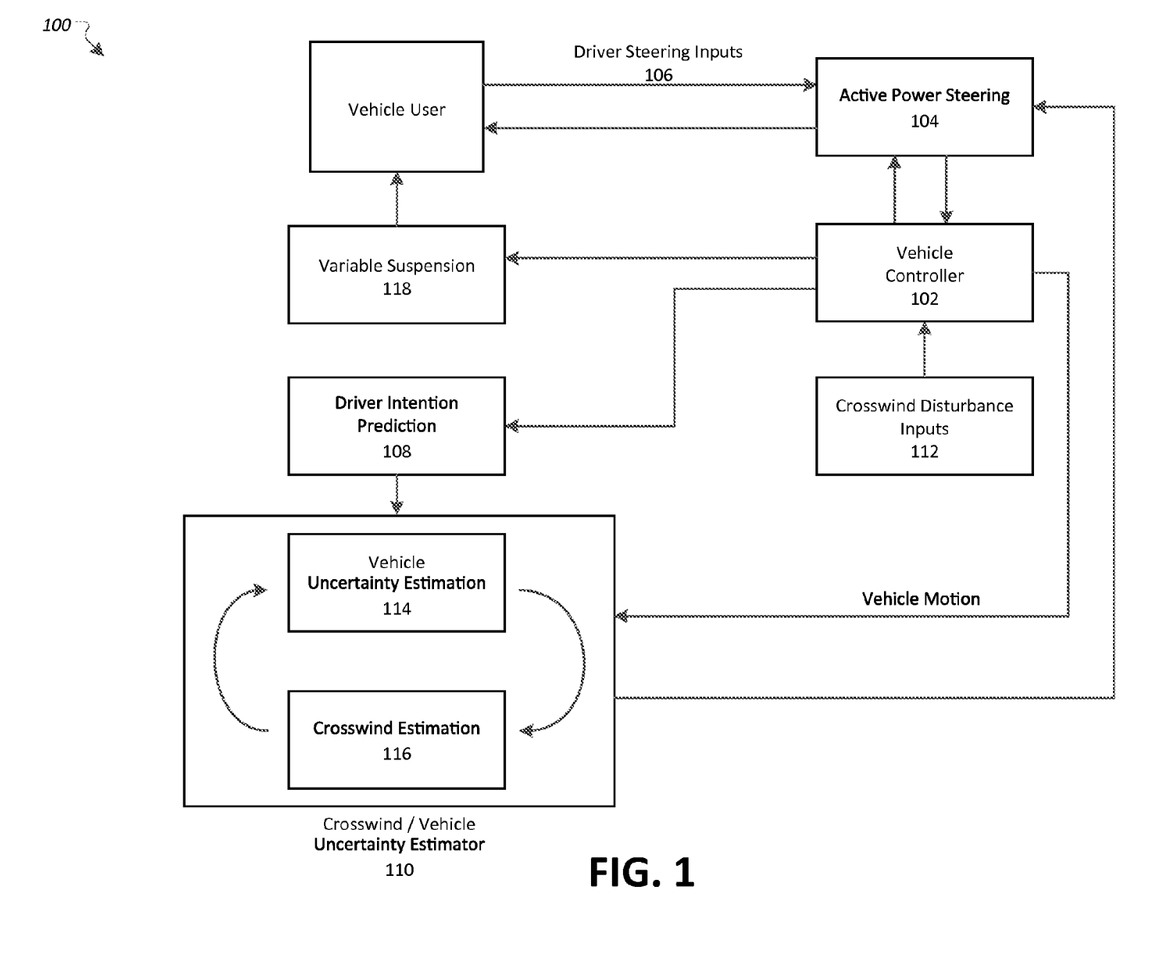
FIG. 1 illustrates an exemplary vehicle system for compensating for identified crosswind conditions.

FIG. 1 illustrates an exemplary vehicle system 100 for compensation for identified crosswind conditions. The system 100 includes a vehicle controller 102 receiving driver steering inputs 106, such as from steering-angle sensors of an active power steering system 104, which may be used by the vehicle controller 102 to predict driver intention 108. The vehicle controller 102 further receives crosswind disturbance inputs 112, such as from vehicle yaw rate sensors and/or wheel-speed sensors, which may be used to determine actual vehicle movement. As explained in detail below, based on these inputs, a crosswind and vehicle uncertainty estimator 110 of the vehicle system 100 may perform an estimation of vehicle uncertainty 114 and crosswind estimation 116 using a recursive-least-squares method with multiple forgetting factors to provide for improved estimation of relatively fast-changing crosswinds in relation to driver inputs. Based on the crosswind estimation 116, such as that determined by the crosswind and vehicle uncertainty estimator 110, the vehicle controller 102 may be configured to compensate for the detected crosswind disturbance by controlling one or more of the active power steering system 104 and a variable suspension 118 system.

The vehicle controller 102 may be implemented as a processor-based computing device having a processor in communication with various types of memory such as a temporary memory and non-volatile data storage device. The vehicle controller 102 may be used to control various vehicle systems, such as transmission, suspension, steering, brakes, and the like. The vehicle controller 102 may also include communications ports or channels that may be used to transfer data to and from the vehicle controller 102 to effect control of one or more vehicle systems and/or to provide diagnostic information to other systems.

The active power steering system 104 may include a motor configured to selectively provide servo or power assistance steering boost to augment driver steering inputs 106 received from the driver. As one example, a motor may be selectively coupled to the steering system by way of a gearbox including steering assist gearing and optionally a clutch. Control of the motor may be effected by a vehicle controller 102 configured to receive various inputs, such as an indication of driver steering inputs 106 from a driver torque sensor, the inputs 106 indicative of driver intention 108. The driver torque sensor may measure driver input through various mechanisms, such as optically or inductively. Based on the driver steering inputs 106, the vehicle controller 102 may be configured to control the motor to provide an appropriate amount of steering boost. While the active power steering system 104 is described as including a motor and gearbox, it should be noted that the active power steering system 104 may be any of various types of power assist systems, including, as some examples, hydraulic assistance (HPAS), electro-hydraulic assistance (EHPAS) or electro-mechanical assistance (EPAS) systems.

The crosswind and vehicle uncertainty estimator 110 may be implemented by one or more computing devices of the vehicle system 100 (e.g., the vehicle controller 102). As one example, the crosswind and vehicle uncertainty estimator 110 may be implemented as software stored in a memory that may be executed by a processor of the vehicle controller 102 to provide the operations of the crosswind and vehicle uncertainty estimator 110 described herein. Alternatively, the crosswind and vehicle uncertainty estimator 110 and its components may be provided as hardware or firmware, or combinations of software, hardware and/or firmware.

More specifically, with respect to the improved crosswind estimation 116, the crosswind and vehicle uncertainty estimator 110 may utilize a mathematical model for vehicle lateral dynamics. This model may be represented as follows:

$$m \cdot x_{mea} = F_{y,steer} + F_{y,crosswind}, F_{y,steer} = f(\delta) \Rightarrow x_{mea} = x_{steer} + x_{crosswind} \quad (1)$$

where $x_{steer}$ is the driver intended vehicle motion due to steering; $F_{y,crosswind}$ is the crosswind disturbance force; m is the vehicle inertia; $x_{mea}$ is measured vehicle motion; and $x_{crosswind}$ is vehicle motion induced by crosswind. The $x_{steer}$ driver intended vehicle motion may be determined based on the driver steering inputs 106, while the $x_{mea}$ measured vehicle motion may be measured based on vehicle sensors.

The crosswind and vehicle uncertainty estimator 110 may be configured to estimate the crosswind disturbance by comparing the vehicle motion intended by the driver with the motion as measured by sensors of the vehicle. However, the vehicle is neither linear in motion nor time-invariant. Thus, actual vehicle dynamics may be modeled by the crosswind and vehicle uncertainty estimator 110 as:

$$x_{mea} = \sigma(x_{steer}, x_{mea}) \cdot x_{steer} + x_{crosswind} \quad (2)$$

where $\sigma(x_{steer}, x_{mea})$ represents the model uncertainty 114 of the vehicle. This uncertainty 114 may degrade the crosswind estimation 116, especially when the crosswind estimation 116 is relatively small.

The crosswind and vehicle uncertainty estimator 110 may utilize a recursive-least-squares (RLS) method to estimate values of parameters of a system that vary over time. More specifically, the crosswind and vehicle uncertainty estimator 110 may utilize the RLS method to estimate values for vehicle uncertainty 114 and crosswind 116 together, such that the crosswind estimation 116 sensitivity may be improved. In the RLS method, more weight may be given to recent data and less weight to older data, thereby allowing older data to be forgotten or removed from consideration over time. Using the RLS method, the crosswind and vehicle uncertainty estimator 110 may approximate the model uncertainty of the vehicle $\sigma(x_{steer}, x_{mea})$ as an autoregressive-moving-average (ARMA) model as follows:

$$\sigma(x_{steer}, x_{mea}) \approx b_n \cdot x_{steer}(n) - a_m \cdot x_{mea}(m) \quad (3)$$

Therefore, equation (2) becomes:

$$x_{mea}(k) = b_n \cdot x_{steer}(n) - a_m \cdot x_{mea}(m) \cdot x_{steer} + x_{crosswind}(k) \quad (4)$$

where n=k, k−1, ... and m=k−1, k−2, ... Equation (4) may further be rewritten in linear parametric form as follows:

$$Y = \phi^T \cdot \theta, \phi = [x_{steer}, x_{mea}, 1]^T, \theta = [a_n, b_m, x_{crosswind}]^T \quad (5)$$

Rather than merely using an RLS approach to estimate vehicle dynamic parameters, in some examples the crosswind and vehicle uncertainty estimator 110 may utilize an improved crosswind estimation 116 approach with multiple RLS forgetting factors to account for relatively slower-changing vehicle uncertainty, and relatively faster-changing crosswind. Therefore, the recursive solution becomes:

$$\begin{bmatrix} \hat{\theta}_1(k) \\ \hat{\theta}_2(k) \end{bmatrix} = \begin{bmatrix} I & L_1(k)\phi_2(k) \\ L_2(k)\phi_1(k) & 1 \end{bmatrix}^{-1} \cdot \begin{bmatrix} \hat{\theta}_1(k-1) + L_1(k)(y(k) - \phi_1(k) \cdot \hat{\theta}_1(k-1)) \\ \hat{\theta}_2(k-1) + L_2(k)(y(k) - \phi_2(k) \cdot \hat{\theta}_2(k-1)) \end{bmatrix} \quad (6)$$

where $L_1$ is the update gain with slower forgetting factor $\lambda_1$ to account for estimation of vehicle uncertainty 114; $L_2$ is the update gain with faster forgetting factor $\lambda_2$, which accounts for crosswind estimation 116; and I is an m+n by m+n identity matrix. The forgetting factors $\lambda_1$ and $\lambda_2$ may be chosen from the range (0<λ≤1), and may each represent a weighting that reduces the influence of older data. Moreover, different forgetting factors $\lambda_1$ and $\lambda_2$ may be used for vehicle uncertainty 114 as compared to crosswind estimation 116, to allow the RLS method to more accurately track these parameters that vary according to different variation rates.

The variable suspension 118 may be configured to control aspects of the suspension of the vehicle system 100. For instance, the variable suspension 118 may be configured to adjust vehicle roll stiffness based on inputs received from the vehicle controller 102. As one example, the variable suspension 118 may receive inputs from the vehicle controller 102 configured to cause the vehicle to increase vehicle roll stiffness during cornering maneuvers. As explained in detail below, the variable suspension 118 and/or the active power steering system 104 may be utilized based on detected crosswind conditions to aid in compensation of detected crosswind disturbance by the system 100 to reduce driver demand and increase driver comfort.

Figure 2A:
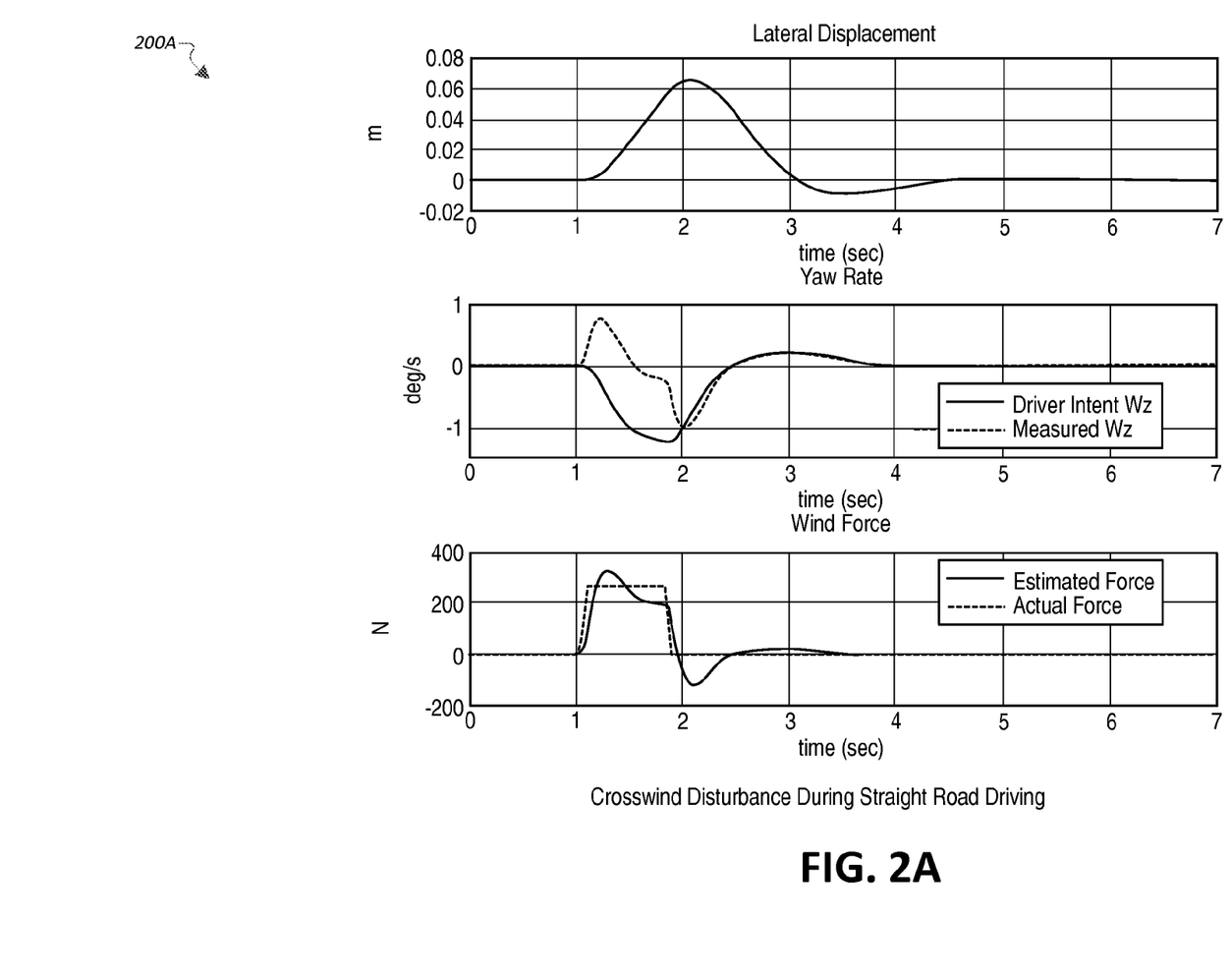
FIG. 2A illustrates an exemplary estimation of crosswind with respect to a vehicle headed in a straight direction of travel.
Figure 2B:
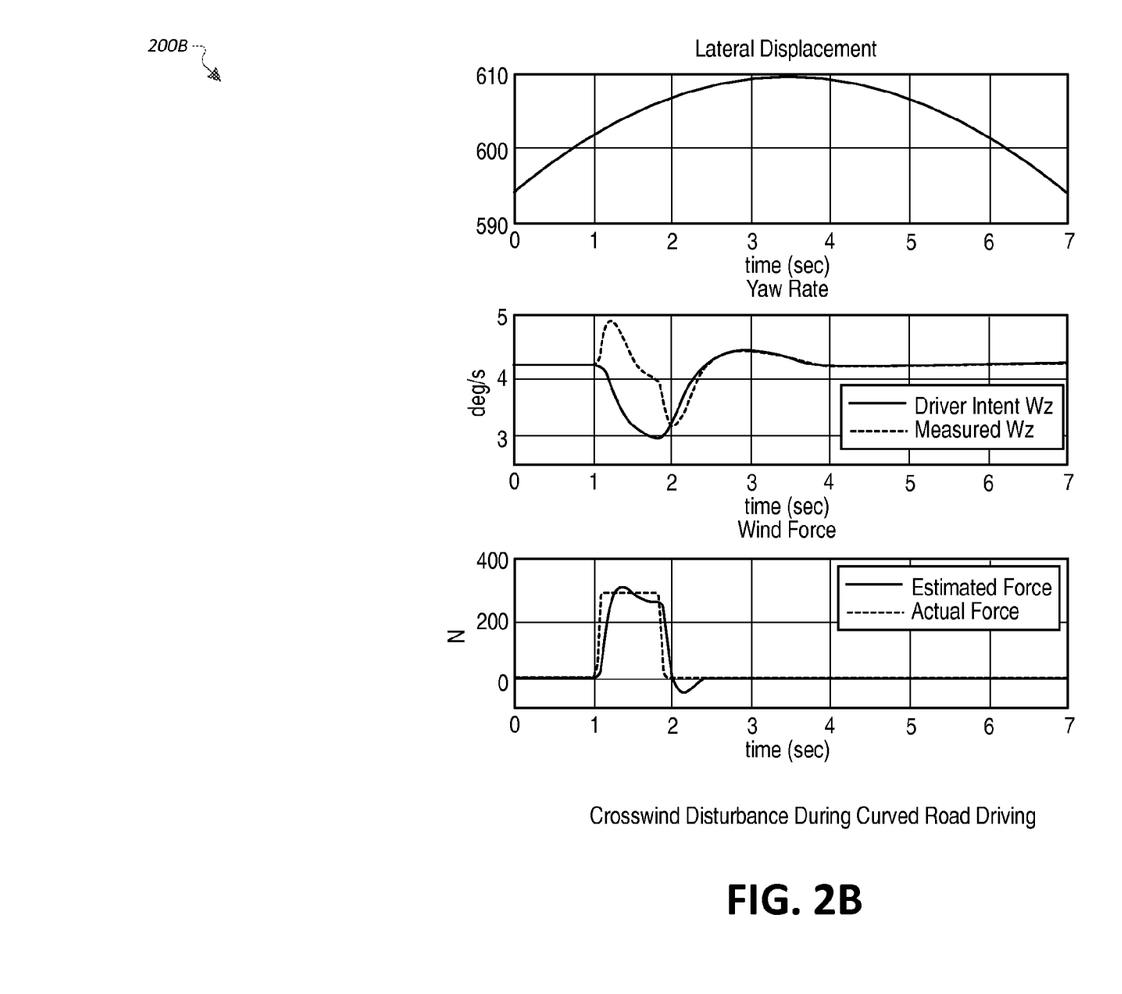
FIG. 2B illustrates an exemplary estimation of crosswind with respect to a vehicle headed along a curved road.
Figure 2C:
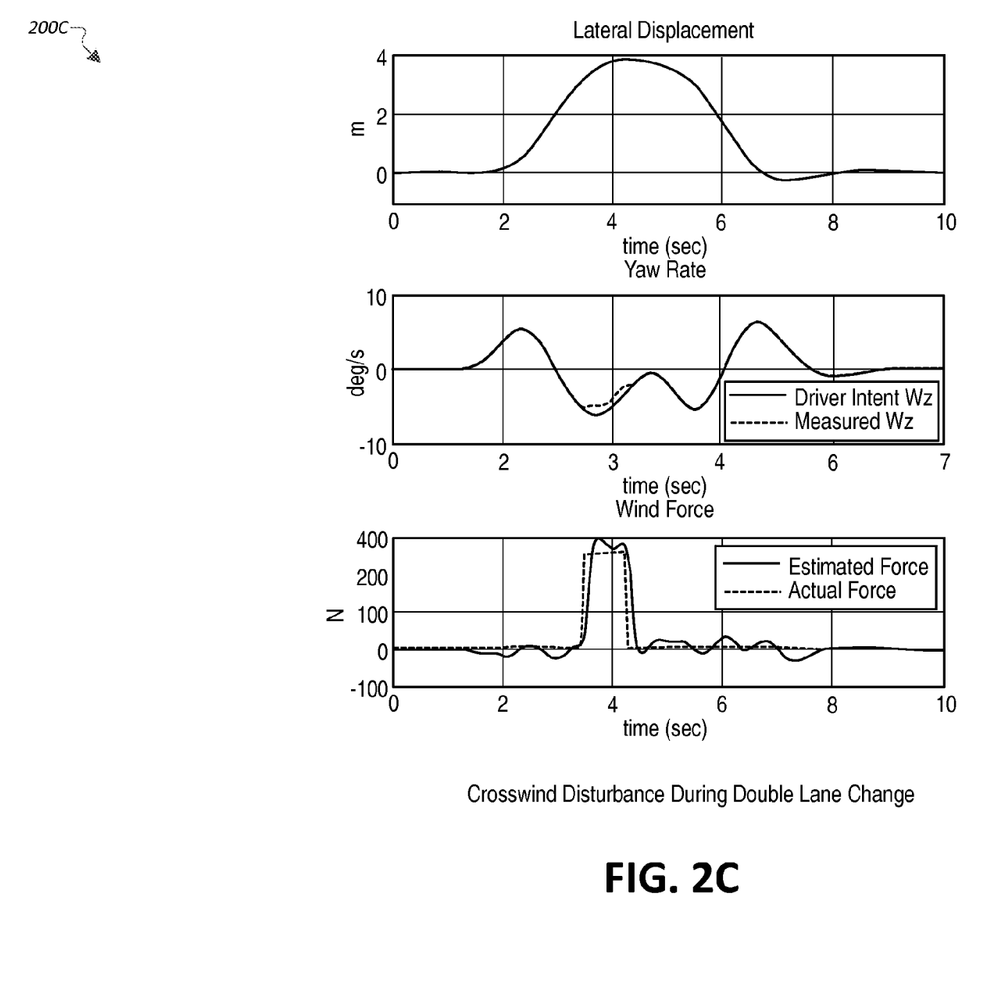
FIG. 2C illustrates an exemplary estimation of crosswind with respect to a vehicle performing a double lane change maneuver.

FIGS. 2A-2C each illustrates an exemplary scenario 200A-C including an estimation of crosswind 116 in different vehicle conditions. These scenarios 200A-C illustrate examples of the additional accuracy in crosswind estimation 116 gained through use of the enhanced RLS method with multiple forgetting factors.

FIG. 2A illustrates an exemplary scenario 200A including an estimation of crosswind 116 with respect to a vehicle system 100 headed in a straight direction of travel. The exemplary scenario 200A includes a 40 km/h crosswind interaction with the vehicle system 100 traveling at 80 km/h down a road. As shown in the scenario 200A, the lateral displacement of the vehicle system 100 over time proceeds in one direction, back in the other direction past the original displacement, and then returns to the original course with further correction. The scenario 200A further illustrates yaw rate over the same period of time, including both measured yaw rate and driver intent yaw rate. The yaw rate or yaw velocity of a vehicle system 100 may measure angular velocity of rotation of the vehicle system 100 movement around the yaw axis, i.e., changes in direction of the vehicle system 100, and may commonly be measured in degrees per second or radians per second. The measured yaw rate may include data received from a yaw rate sensor of the vehicle system 100, while the driver intent yaw rate may include data received from a steering sensor of the vehicle system 100. The scenario 200A further illustrates effectively estimated crosswind 116 over the period of time using the enhanced RLS method with multiple forgetting factors, as can be seen according to the plotted and actual crosswind force.

FIG. 2B illustrates an exemplary scenario 200B including an estimation of crosswind 116 with respect to a vehicle system 100 headed along a curved road. In the scenario 200B, the lateral displacement of the vehicle system 100 is indicative of the lateral travel along a curved road. Further, the driver intent yaw rate illustrates driver intent to generally continue along the curved path, further including a driver adjustment between seconds one and two of the example. The scenario 200B further illustrates estimated crosswind 116 and actual crosswind force over the same period of time using the enhanced RLS method with multiple forgetting factors. As shown in the scenario 200B, the enhanced RLS method effectively separates the motion due to vehicle maneuvers from the crosswind disturbance.

FIG. 2C illustrates an exemplary scenario 200C including an exemplary estimation of crosswind 116 with respect to a vehicle system 100 performing a double lane change maneuver. As with the scenarios 200A and 200B, the exemplary scenario 200C illustrates the estimated crosswind 116 determined according to measured yaw rate and driver intent yaw rate, with relatively good separation of crosswind estimation 116 from the estimate of vehicle uncertainty 114.

Figure 3:
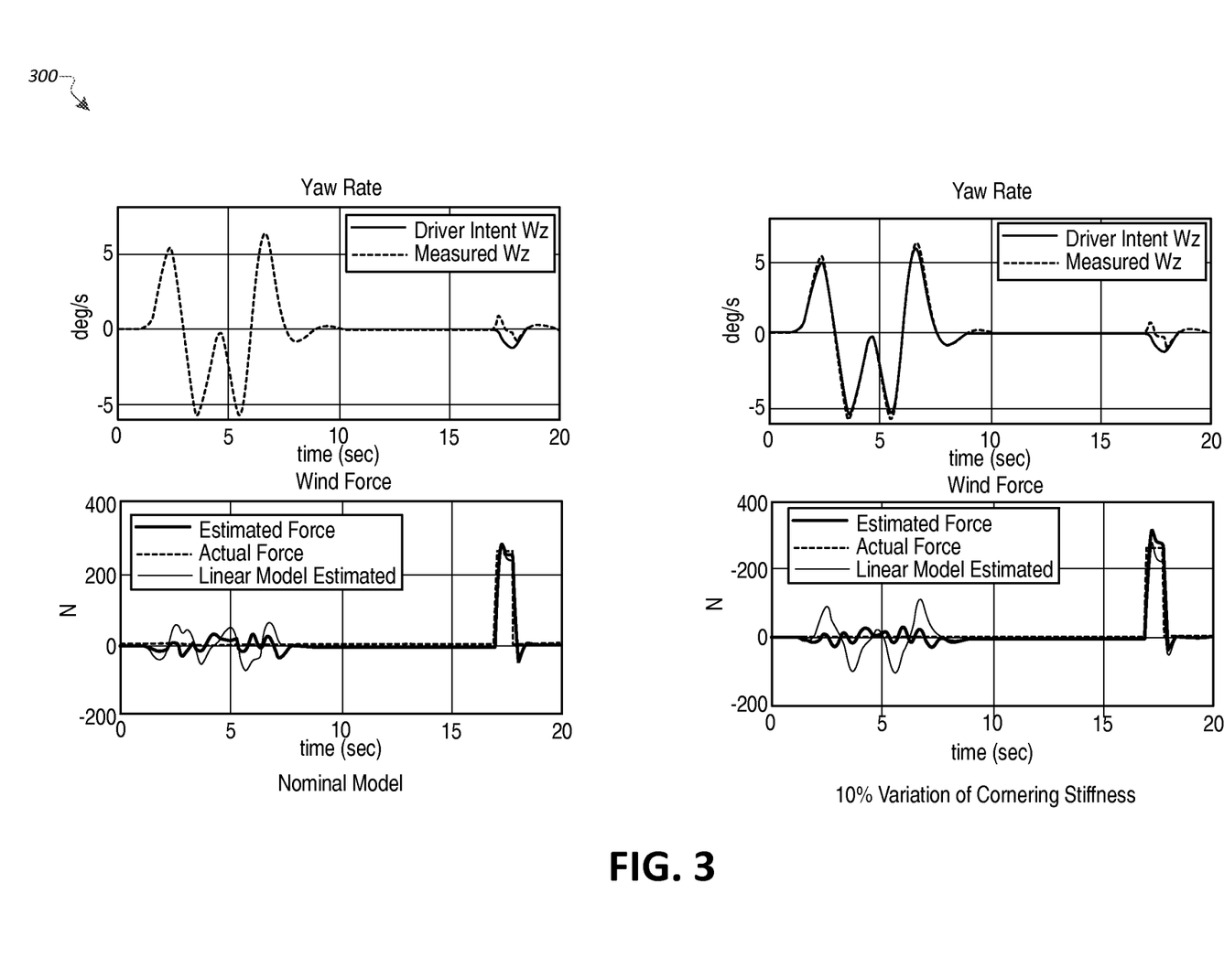
FIG. 3 illustrates an exemplary comparison of a linear model implementation of crosswind estimation with a multiple-forgetting factor implementation of crosswind estimation.

FIG. 3 illustrates an exemplary comparison 300 of a linear model implementation of crosswind estimation 116 with a multiple-forgetting factor implementation of crosswind estimation 116, such as provided by way of the crosswind and vehicle uncertainty estimator 110. The comparison 300 illustrates two scenarios, a nominal model, and also an estimation having a 10% variation in tire stiffness. As shown in the comparison 300, the linear model estimation suffers due to vehicle uncertainty 114 contamination of the crosswind estimation 116. This contamination is especially evident in the 10% variation in tire stiffness scenario, in which the linear model implementation includes substantially more driver intention 108 component as compared to the estimated crosswind 116 force. As compared to the linear model estimation, the enhanced RLS method more effectively separates the motion due to vehicle maneuvers from the crosswind disturbance.

The multiple-forgetting factor RLS estimation approach improves the estimation of crosswind 116 force, which leads to an enhanced estimation of driver's driving demand. Upon the detection of possible crosswind 116 force, an active power steering system 104 and/or a variable suspension 118 providing for adjustable roll-stiffness may be utilized to reduce the effect of crosswind 116 force so that the driving demand can be minimized and driver comfort can be retained.

Figure 4:
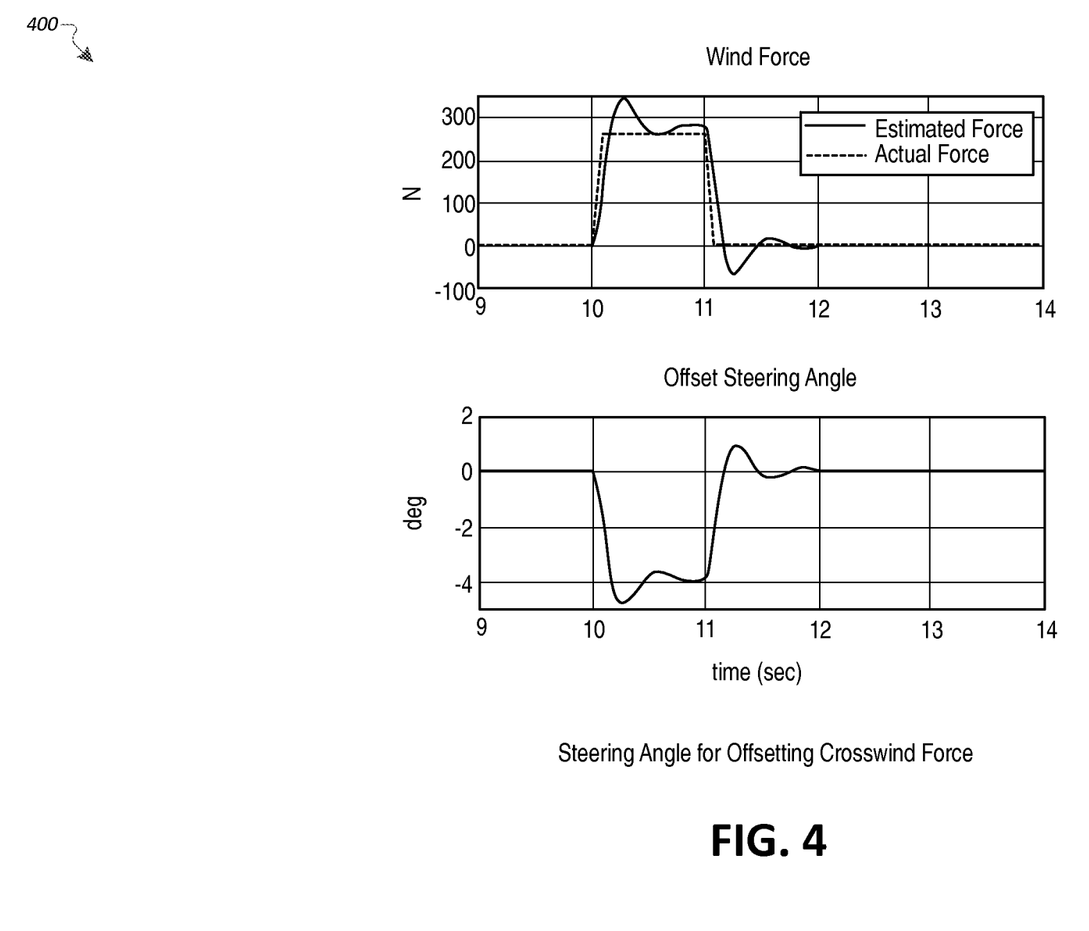
FIG. 4 illustrates an exemplary steering assistance control strategy based on crosswind estimation.

FIG. 4 illustrates an exemplary steering assistance control strategy 400 based on crosswind estimation 116. When the crosswind 116 is detected, an offset steering angle proportional to the estimated crosswind 116 force may be determined by the vehicle controller 102 according to the strategy 400, and sent to the active power steering system 104. As illustrated, an actual crosswind force applied to a vehicle system 100 may be detected as an estimated crosswind 116 force. Based on the estimated crosswind 116 force, an offset steering angle may be identified as degrees of steering adjustment in a direction opposite to the estimated crosswind 116 force. The identified degrees of steering adjustment may be applied to the active power steering system 104 by the vehicle controller 102, to allow the vehicle system 100 to make automatic correction for the detected crosswind condition.

Figure 5:
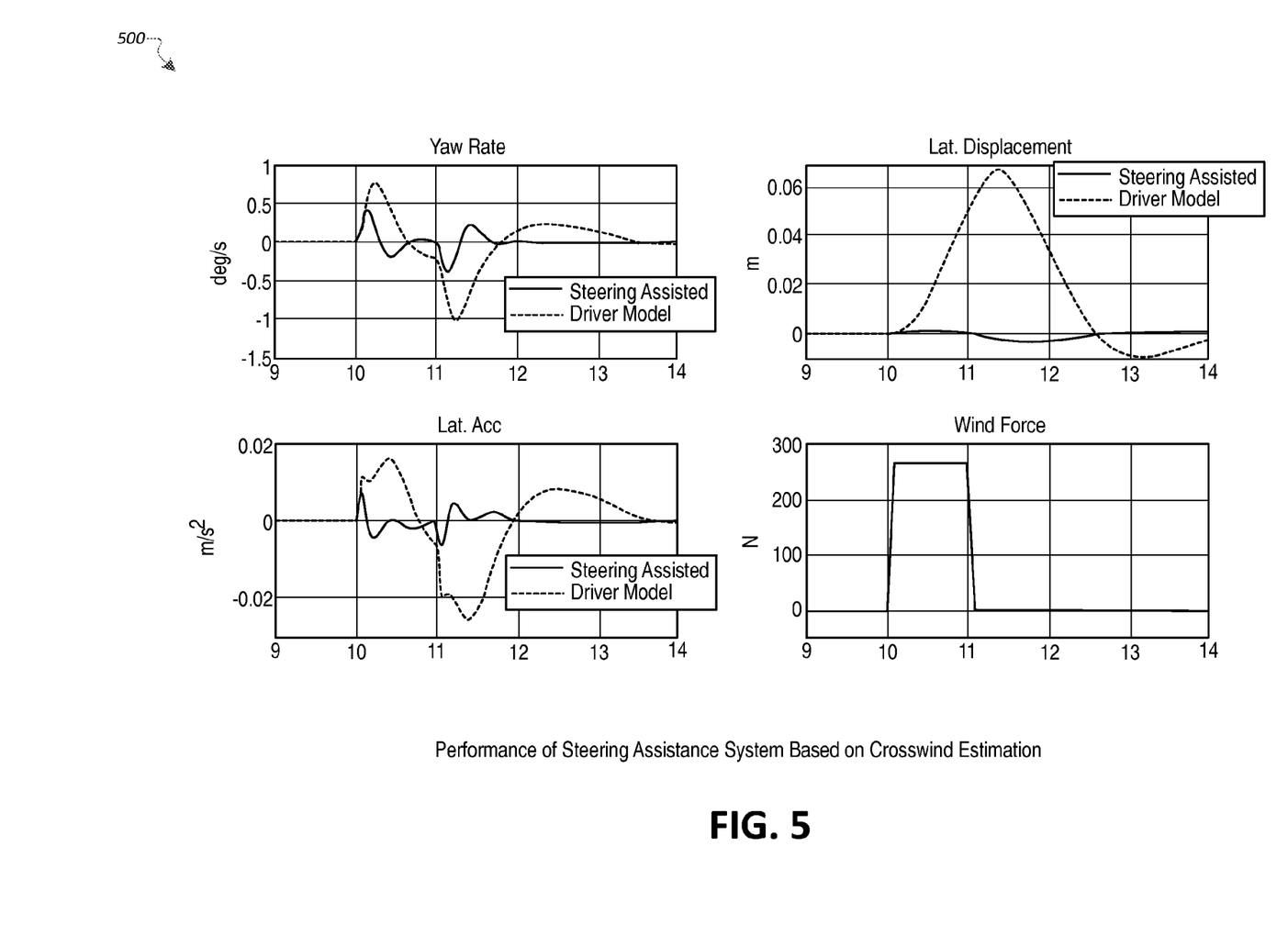
FIG. 5 illustrates an exemplary performance model of the steering assistance control strategy with respect to a vehicle encountering crosswind conditions.

FIG. 5 illustrates an exemplary performance model 500 of the steering assistance control strategy 400 with respect to a vehicle encountering crosswind conditions. As shown, the model 500 may be used to illustrate driver performance of the lane keeping task, with the determined offset steering angle as illustrated in FIG. 4 added through the active power steering system 104. As further illustrated, by way of the application of adjusted offset steering angle, the steering assisted vehicle system 100 shows significantly less lateral deviation during the wind force. Therefore, the application of adjusted offset steering angle to the active power steering system 104 by the vehicle controller 102 corrected at least in part for the crosswind condition, reducing driver demand.

Figure 6:
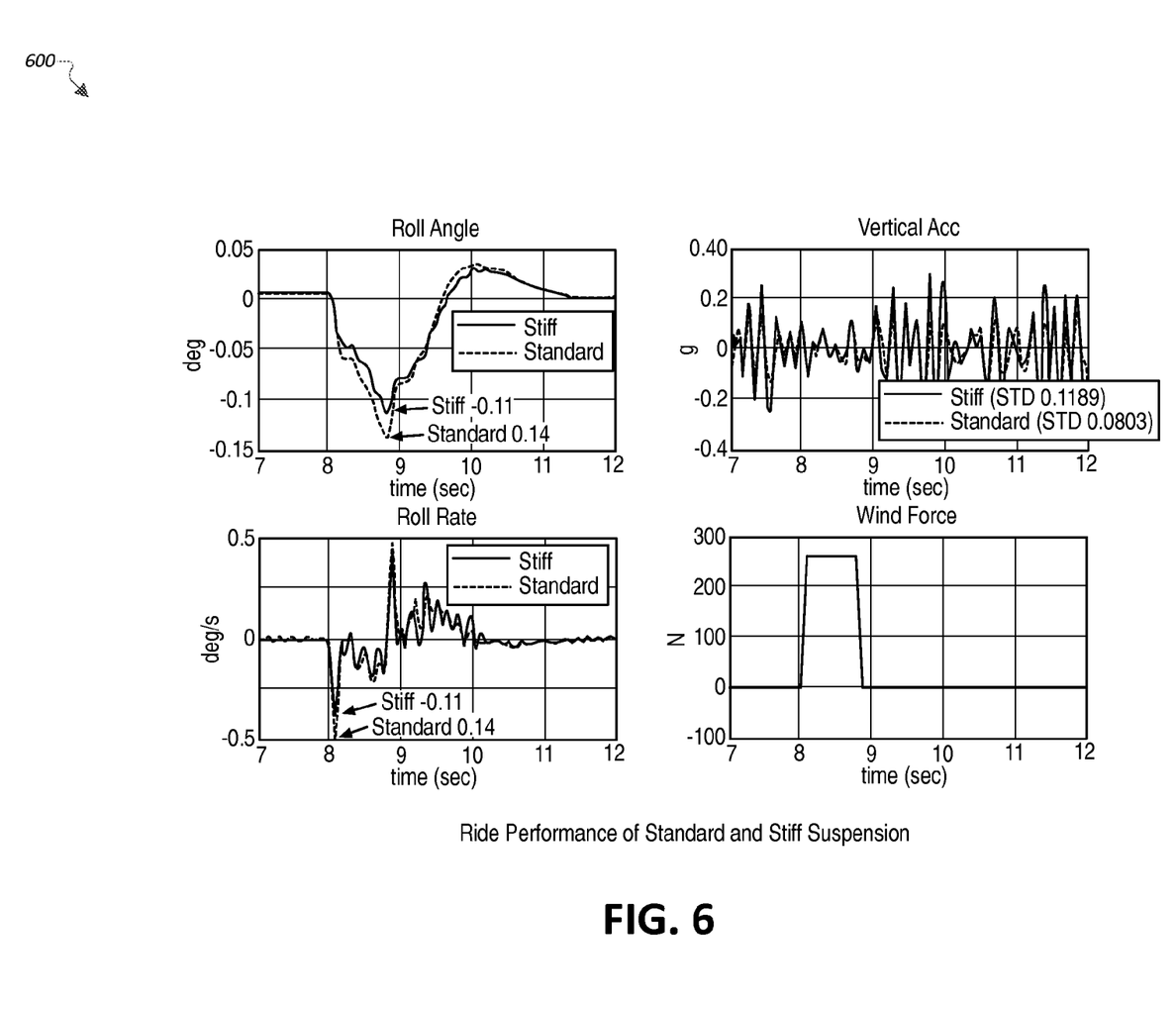
FIG. 6 illustrates an exemplary ride performance model of standard and stiff suspensions.

FIG. 6 illustrates exemplary ride performance model 600 in terms of vertical acceleration and crosswind effect to the driver in terms of roll motion. The standard suspension setting provides a better ride performance but more roll motion. The stiffer suspension sacrifices ride performance to reduce roll motion. Thus, to further improve driver convenience and ride comfort, the variable suspension 118 may be configured to control aspects of the suspension system of the vehicle 100 to temporarily increase vehicle roll stiffness upon detection of crosswind 116 forces, and to return the roll stiffness to a default value once the crosswind 116 forces dissipate.

Figure 7:
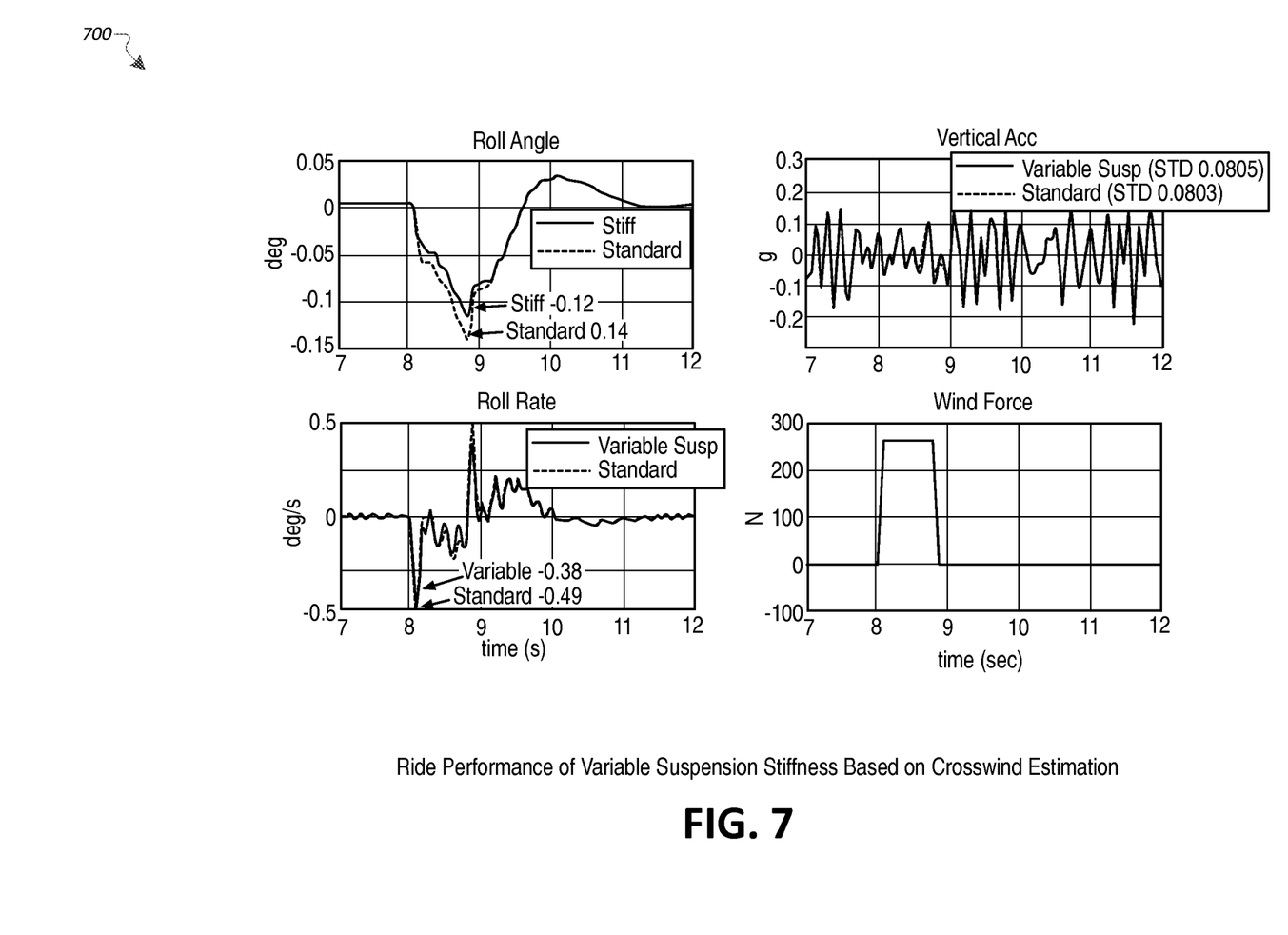
FIG. 7 illustrates an exemplary ride performance model of variable suspension stiffness with real-time decision-making based on crosswind estimation.

FIG. 7 illustrates exemplary ride performance model 700 of variable suspension stiffness with real-time decision-making based on crosswind estimation 116. As shown in the Figure, the vehicle system 100 reduces roll motion while retaining similar ride performance by using the variable suspension 118 to selectively increase suspension stiffness during detected crosswind conditions. Thus, during a crosswind driving event, the vehicle system 100 may experience reduced lane drift, and allow the vehicle to automatically be kept inside the intended lane.

Figure 8:
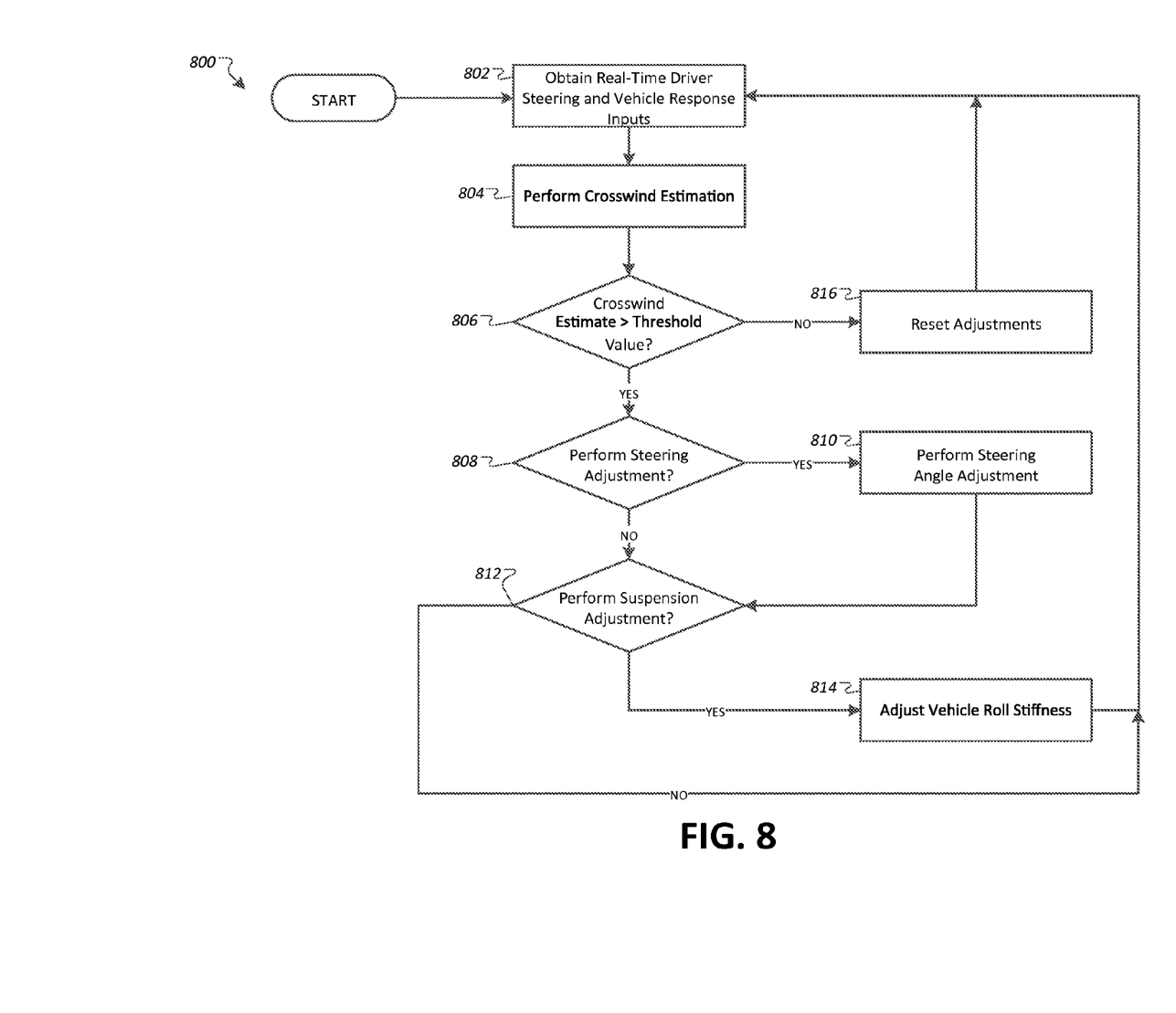
FIG. 8 illustrates an exemplary process for compensating for identified crosswind conditions.

FIG. 8 illustrates an exemplary process 800 for compensating for identified crosswind conditions. The process 800 may be performed, for example, by a vehicle controller 102 of the vehicle system 100 of FIG. 1 including a crosswind and vehicle uncertainty estimator 110 (e.g., using the multiple-forgetting factor RLS estimation approach to improve crosswind estimation 116). Upon the detection of potential crosswind condition by the crosswind and vehicle uncertainty estimator 110, the vehicle controller 102 may be configured to utilize one or more of steering assistance and variable suspension assistance to mitigate the effects of the detected crosswind 116 for the vehicle driver.

More specifically, in block 802, the vehicle system 100 obtains real-time driver steering and vehicle response inputs. For example, the vehicle controller 102 may receive driver steering inputs 106 indicative of driver intention 108 from a steering sensor of the active power steering system 104, and may receive crosswind disturbance inputs 112 indicative of a potential crosswind condition from a yaw rate sensor.

In block 804, the vehicle system 100 performs crosswind estimation 116. For example, the crosswind and vehicle uncertainty estimator 110 may receive the updated driver steering inputs 106 and crosswind disturbance inputs 112, and may utilize them as the most recent set of data for RLS crosswind estimation 116 as discussed in detail above. Based on the RLS crosswind estimation 116, the crosswind and vehicle uncertainty estimator 110 may accordingly determine an estimate of vehicle uncertainty 114, as well as improved crosswind estimation 116.

In decision point 806, the vehicle system 100 determines whether the crosswind estimate 116 exceeds a predetermined threshold value. For example, the predetermined threshold value may be set to a level indicative of a crosswind sufficient to warrant vehicle system 100 action or intervention to ensure driver attention or to avoid driver distraction. If the vehicle controller 102 determines that the crosswind estimate 116 exceeds the predetermined threshold value, control passes to decision point 808. Otherwise control passes to block 816.

In decision point 808, the vehicle system 100 determines whether to perform a steering adjustment. For example, the vehicle controller 102 may determine based on vehicle settings or based on the extent of the crosswind estimate 116 whether steering adjustment is appropriate. If the vehicle controller 102 determines to perform steering angle adjustment, control passes to block 810. Otherwise, control passes to decision point 812.

In block 810, the vehicle system 100 performs steering angle adjustment. For example, the vehicle controller 102 may determine an offset steering angle proportional to the estimated crosswind 116 force. As illustrated in FIG. 4, based on the estimated crosswind 116 force, an offset steering angle may be identified as degrees of steering adjustment in a direction opposite to the estimated crosswind 116 force. The vehicle controller 102 may further apply the determined offset steering angle to the active power steering system 104 to allow the vehicle system 100 to make automatic correction for the detected crosswind condition.

In decision point 812, the vehicle system 100 determines whether suspension adjustment should be performed. For example, the vehicle controller 102 may determine based on vehicle settings or based on the extent of the crosswind estimate 116 whether suspension adjustment is appropriate. If the suspension adjustment should be performed, control passes to block 814. Otherwise, control passes to block 802 to continue to monitor the crosswind situation.

In block 814, the vehicle system 100 adjusts vehicle roll stiffness. For example, as illustrated in FIG. 7, the vehicle controller 102 may request for the vehicle suspension to increase suspension stiffness. After block 814, control passes to block 802 to continue to monitor the crosswind situation.

In block 816, the vehicle system 100 resets adjustments performed to make automatic correction for the detected crosswind condition. For example, the vehicle controller 102 may remove any angle adjustment previously applied to account for estimated crosswind 116, and may reduce vehicle suspension stiffness back to a value preferred for driver comfort. After block 816, control passes to block 802 to continue to monitor the crosswind situation.

Thus, upon detection of a crosswind condition, a vehicle system 100 may be configured to correct for the estimated crosswind 116 to reduce vehicle control demand on the driver. For example, the system 100 may make adjustments such as using the active power steering system 104 to apply an offset steering angle to make automatic correction for the detected crosswind condition on vehicle motion or command a variable suspension 118 system to tighten the suspension to reduce crosswind-induced roll. By taking one or more of these corrective actions, the adaptive drive control system may compensate for the detected crosswind disturbance and help to reduce driver demand and increase driver comfort.

In general, computing systems and/or devices such as the crosswind and vehicle uncertainty estimator 110 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the crosswind and vehicle uncertainty estimator 110 generally include computer-executable instructions that may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein. Software to implement some or all of the functionality of the crosswind and vehicle uncertainty estimator 110 may be one such computer program product. In one example, the crosswind and vehicle uncertainty estimator 110 may be provided as software that when executed by the processor provides the operations described herein. Alternatively, the crosswind and vehicle uncertainty estimator 110 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    estimating crosswind by a vehicle controller according to driver steering inputs indicative of driver intention and crosswind disturbance inputs indicative of a potential crosswind condition; and
    when the estimated crosswind exceeds a predetermined threshold, utilizing the vehicle controller to correct the crosswind condition to reduce vehicle control demand on the driver, the correction including a steering angle adjustment and a suspension stiffness adjustment.

2. The method of claim 1, further comprising:
    determining an offset steering angle proportional to the estimated crosswind force; and
    providing the offset steering angle to an active power steering system to make the correction for the detected crosswind condition.

3. The method of claim 1, further comprising providing an indication to a variable roll-stiffness system of the vehicle to tighten the suspension and reduce crosswind-induced roll based on the crosswind effect to make the correction for the detected crosswind condition.

4. The method of claim 1, further comprising:
    identifying a first forgetting factor accounting for a rate of change of vehicle uncertainty and a second forgetting factor accounting for a rate of change of crosswind estimation, the first and second forgetting factors accounting for relatively slower-changing vehicle uncertainty and relatively faster-changing crosswinds; and
    applying the driver steering inputs and crosswind disturbance inputs to a recursive-least-squares heuristic specialized according to the first and second forgetting factors to estimate crosswind.

5. The method of claim 4, further comprising:
    receiving updated driver steering inputs indicative of driver intention and updated crosswind disturbance inputs indicative of a potential crosswind condition; and
    applying the updated driver steering inputs and crosswind disturbance inputs to the recursive-least-squares heuristic according to the first and second forgetting factors.

6. The method of claim 1, further comprising at least one of receiving the driver steering inputs at least in part from a steering wheel sensor, and receiving the crosswind disturbance inputs at least in part from a vehicle yaw rate sensor.

7. The method of claim 1, further comprising:
    determining that the crosswind estimation no longer exceeds the predetermined threshold; and
    utilize the vehicle controller to reset the corrections.

8. A computing device storing an application executable by a processor of the computing device to provide operations comprising:
    estimating crosswind by a vehicle controller according to driver steering inputs indicative of driver intention and crosswind disturbance inputs indicative of a potential crosswind condition; and
    when the estimated crosswind exceeds a predetermined threshold, utilizing the vehicle controller to correct the crosswind condition to reduce vehicle control demand on the driver, the correction including a steering angle adjustment and a suspension stiffness adjustment.

9. The computing device of claim 8, further executing the application to provide operations comprising:

determining an offset steering angle proportional to the estimated crosswind force; and providing the offset steering angle to the active power steering system to make correction for the detected crosswind condition.

10. The computing device of claim 8, further executing the application to provide operations comprising providing an indication to a variable roll-stiffness system of the vehicle to tighten the suspension and reduce crosswind-induced roll based on the crosswind effect to make correction for the detected crosswind condition.

11. The computing device of claim 8, further executing the application to provide operations comprising:

identifying a first forgetting factor accounting for a rate of change of vehicle uncertainty and a second forgetting factor accounting for a rate of change of crosswind estimation, the first and second forgetting factors accounting for relatively slower-changing vehicle uncertainty and relatively faster-changing crosswinds; and applying the driver steering inputs and crosswind disturbance inputs to a recursive-least-squares heuristic specialized according to the first and second forgetting factors to estimate crosswind.

12. The computing device of claim 11, further executing the application to provide operations comprising:

receiving updated driver steering inputs indicative of driver intention and updated crosswind disturbance inputs indicative of a potential crosswind condition; and applying the updated driver steering inputs and crosswind disturbance inputs to the recursive-least-squares heuristic according to the first and second forgetting factors.

13. The computing device of claim 8, further executing the application to provide operations comprising at least one of receiving the driver steering inputs at least in part from a steering wheel sensor, and receiving the crosswind disturbance inputs at least in part from a vehicle yaw rate sensor.

14. The computing device of claim 8, further executing the application to provide operations comprising:

determining that the crosswind estimation no longer exceeds the predetermined threshold; and utilizing the vehicle controller to reset the corrections.

15. A non-transitory computer-readable medium tangibly embodying computer-executable instructions of a software program, the software program being executable by a processor of a computing device to provide operations comprising:

estimating crosswind by a vehicle controller according to driver steering inputs indicative of driver intention and crosswind disturbance inputs indicative of a potential crosswind condition; and when the estimated crosswind exceeds a predetermined threshold, utilizing the vehicle controller to correct the crosswind condition to reduce vehicle control demand on the driver, the correction including at least one of a steering angle adjustment and suspension stiffness adjustment.

16. The computer-readable medium of claim 15, the software program being further executable by the processor configured to provide operations comprising:

determining an offset steering angle proportional to the estimated crosswind force; and providing the offset steering angle to the active power steering system to make correction for the detected crosswind condition.

17. The computer-readable medium of claim 15, the software program being further executable by the processor configured to provide operations comprising providing an indication to a variable roll-stiffness system of the vehicle to tighten the suspension and reduce crosswind-induced roll based on the crosswind effect to make correction for the detected crosswind condition.

18. The computer-readable medium of claim 15, the software program being further executable by the processor configured to provide operations comprising:

identifying a first forgetting factor accounting for a rate of change of vehicle uncertainty and a second forgetting factor accounting for a rate of change of crosswind estimation, the first and second forgetting factors accounting for relatively slower-changing vehicle uncertainty and relatively faster-changing crosswinds; and applying the driver steering inputs and crosswind disturbance inputs to a recursive-least-squares heuristic specialized according to the first and second forgetting factors to estimate crosswind.

19. The computer-readable medium of claim 18, the software program being further executable by the processor configured to provide operations comprising:

receiving updated driver steering inputs indicative of driver intention and updated crosswind disturbance inputs indicative of a potential crosswind condition; and applying the updated driver steering inputs and crosswind disturbance inputs to the recursive-least-squares heuristic according to the first and second forgetting factors.

20. The computer-readable medium of claim 15, the software program being further executable by the processor configured to provide operations comprising at least one of receiving the driver steering inputs at least in part from a steering wheel sensor, and receiving the crosswind disturbance inputs at least in part from a vehicle yaw rate sensor.

21. The computer-readable medium of claim 15, the software program being further executable by the processor configured to provide operations comprising:

determining that the crosswind estimation no longer exceeds the predetermined threshold; and utilizing the vehicle controller to reset the corrections.

* * * * *